(12) United States Patent
Hanna

(10) Patent No.: US 9,234,437 B1
(45) Date of Patent: Jan. 12, 2016

(54) HYDRODYNAMIC ENERGY GENERATION SYSTEM WITH NEUTRALIZED PRESSURE PUMP

(71) Applicant: Ibrahim Hanna, Miami, FL (US)

(72) Inventor: Ibrahim Hanna, Miami, FL (US)

( * ) Notice: Subject to any disclaimer, the term of this patent is extended or adjusted under 35 U.S.C. 154(b) by 0 days.

(21) Appl. No.: 14/733,951

(22) Filed: Jun. 8, 2015

Related U.S. Application Data

(63) Continuation-in-part of application No. 14/515,101, filed on Oct. 15, 2014, now Pat. No. 9,051,914, which is a continuation-in-part of application No. 14/258,716, filed on Apr. 22, 2014, now abandoned, which is a continuation-in-part of application No. 14/195,133, filed on Mar. 3, 2014, now abandoned.

(60) Provisional application No. 61/925,828, filed on Jan. 10, 2014.

(51) Int. Cl.
 *F01D 15/10* (2006.01)
 *F01D 15/08* (2006.01)
 *F03B 17/00* (2006.01)

(52) U.S. Cl.
 CPC ............... *F01D 15/10* (2013.01); *F01D 15/08* (2013.01); *F03B 17/005* (2013.01); *Y10S 415/916* (2013.01)

(58) Field of Classification Search
 CPC ....... H02K 7/1823; H02K 7/18; Y02D 10/22; Y02E 10/28; F01D 15/10
 USPC ............... 290/1 R, 42, 43, 52, 53, 54; 415/1, 415/182.1, 201; 60/398, 496, 675; 417/337
 See application file for complete search history.

(56) References Cited

U.S. PATENT DOCUMENTS

| | | | | |
|---|---|---|---|---|
| 4,382,365 A | * | 5/1983 | Kira .......................... | F03G 3/00 60/641.11 |
| 4,698,516 A | * | 10/1987 | Thompson .............. | F03B 13/06 290/54 |
| 6,420,794 B1 | * | 7/2002 | Cao ........................ | F03B 17/005 290/43 |

(Continued)

*Primary Examiner* — Tulsidas C Patel
*Assistant Examiner* — Sean Gugger
(74) *Attorney, Agent, or Firm* — Mark Terry

(57) ABSTRACT

A hydrodynamic energy generation system comprises a pump and three vertically aligned compartments and a fourth compartment proximate to the lower ends of the vertically aligned compartments. Each of the three vertically aligned compartments has an opening on an upper end and a lower end. The first compartment has a first turbine mechanically coupled to a first generator producing electrical power when the first turbine is moved by water that falls into the first compartment. The first compartment has a controlled water level under the first turbine. A second turbine proximate to the opening at the second compartment's lower end is mechanically coupled to a pump through gear box and/or second generator producing electrical or rotational power when the second turbine is moved by water flowing out of the second compartment's lower end opening. A pump for moving water from the first and second compartments through the fourth compartment and into the third compartment is at least partially powered by the second generator, mechanically by second turbine and by an external power source according to the following formula (pumping energy=1*disk ratio*flow+external energy), where 1 is the pressure change regardless of pumping height and disk ratio is the (gear box modified) ratio between the driving turbine disk under second compartment and the driving disk of the pump.

19 Claims, 6 Drawing Sheets

(56) References Cited

U.S. PATENT DOCUMENTS

| | | | | |
|---|---|---|---|---|
| 6,510,687 B1 * | 1/2003 | Zaslavsky | ............... | F03D 1/00 52/245 |
| 8,127,542 B1 * | 3/2012 | Dolcimascolo | ......... | F03B 13/06 60/398 |
| 2010/0072754 A1 * | 3/2010 | Huang | ................. | F03B 17/005 290/54 |
| 2012/0074703 A1 * | 3/2012 | Lin | ........................ | F03B 7/00 290/54 |
| 2013/0341928 A1 * | 12/2013 | Steelberg | ............... | F03B 13/10 290/53 |

* cited by examiner

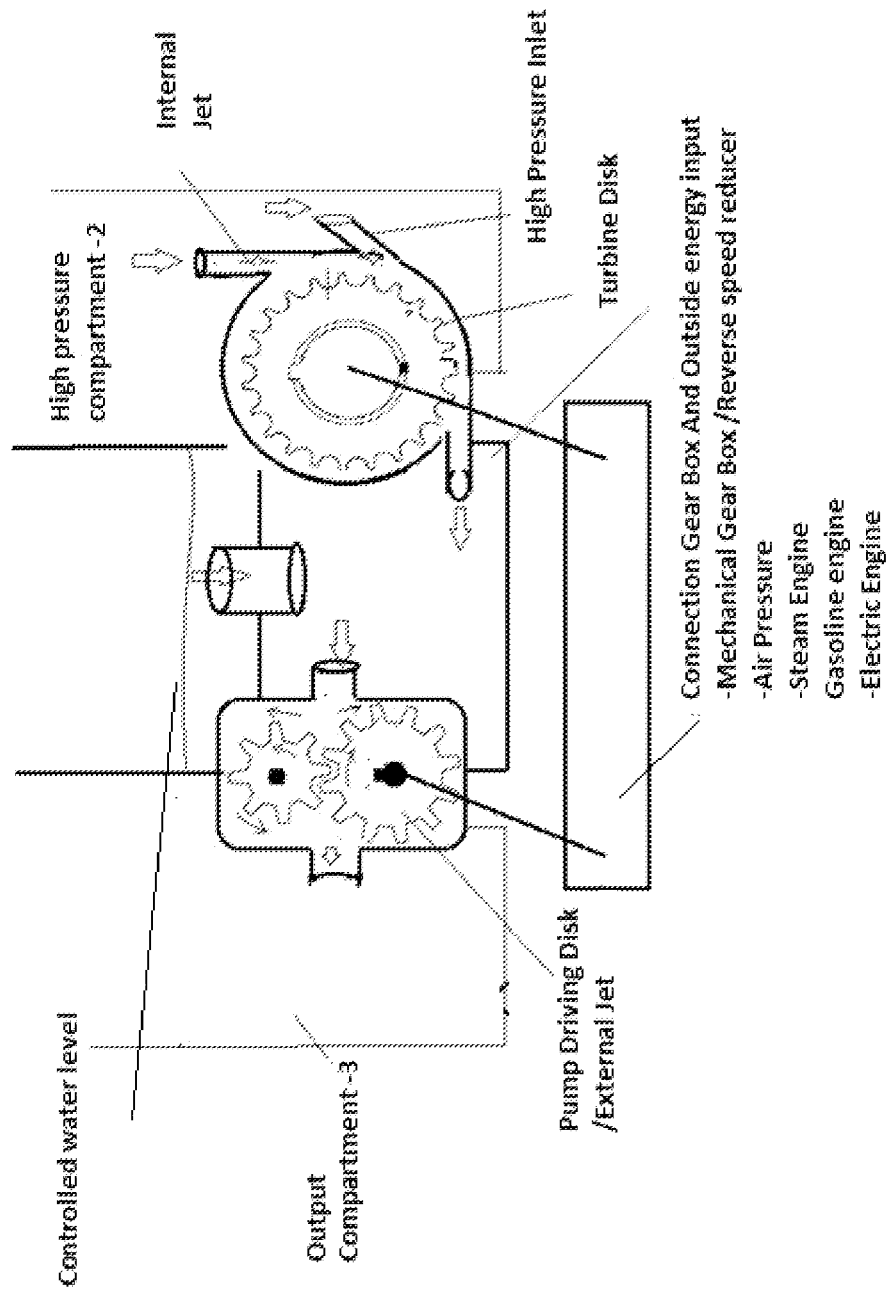
Figure 6- Neutral Pressure Pump

HYDRODYNAMIC ENERGY GENERATION SYSTEM WITH NEUTRALIZED PRESSURE PUMP

CROSS-REFERENCE TO RELATED APPLICATIONS

This patent application is a continuation in part and claims priority to utility patent application Ser. No. 14/515,101 filed Oct. 15, 2014 and entitled "Hydrodynamic Energy Generation System with Dual Fluid Entry System", which is a continuation in part and claims priority to utility patent application Ser. No. 14/258,716 filed Apr. 22, 2014 and entitled "Hydrodynamic Energy Generation System with Energy Recovery and Levering System", which is a continuation in part and claims priority to utility patent application Ser. No. 14/195,133 filed Mar. 3, 2014 and entitled "Hydrodynamic Energy Generation System", which claims priority to provisional patent application No. 61/925,828 filed Jan. 10, 2014 and entitled "Hydrodynamic Energy Generation System." application Ser. Nos. 14/515,101, 14/258,716, 14/195,133 and 61/925,828 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of energy production, and more specifically relates to the field of energy production via hydrodynamic sources.

BACKGROUND OF THE INVENTION

A power generating station is an industrial machine or plant for the generation of mechanical, hydrodynamic or electric power. At the center of nearly all power generating stations is a generator, which typically includes a rotating machine that converts mechanical power into electrical power by creating relative motion between a magnetic field and a conductor. The energy source harnessed to turn the generator varies widely—from moving water and wind, to fossil fuels (such as coal, oil, and natural gas) and nuclear material. In recent times, however, due to the decreasing reserves of fossil fuels and the environmental impact of their use in power generation, cleaner alternatives for the generation of power have become more popular.

Cleaner alternatives for power generation include solar, wind, wave, and geothermal sources. Despite the fact that they are considerably more environmentally-friendly, these alternative power generation techniques have struggled to gain widespread acceptance due to their inefficiencies in generating power, their high cost to establish in comparison to existing fossil fuel technology and their lack of aesthetic appeal (such as wind farms). Another reason for the lack of popularity of cleaner power generation alternatives is the political power of the existing power generation entities. Oil companies, for example, have significant political sway in the United States, as well as abroad, and have resisted attempts to introduce alternative fuel sources into the power generation industry.

One of the most promising clean power generation alternatives is hydroelectric power. Hydroelectricity refers to electricity generated by hydropower, i.e., the production of electrical power through the use of the gravitational force of falling, or hydrodynamic force of flowing, water. Although hydroelectric power is one of the cleanest and most environmentally-friendly sources of energy, it also has the capability to alter or damage its surroundings. In some forms of present use, among the main problems that have been demonstrated by hydroelectric power is significant change in water quality. Because of the nature of hydroelectric systems, the water used in the system can often take on a higher temperature, lose oxygen content, experience siltation, and gain in phosphorus and nitrogen content. This can have a major impact on aquatic life near the region of a hydroelectric plant.

Another major problem with hydroelectric power is the obstruction of a body of water, such as a river, for aquatic life. When used in the context of a flowing body of water, such as a river, a hydroelectric plant can obstruct the natural migration of aquatic life. Salmon, for example, which migrate upstream to spawn every year, are especially impacted by hydroelectric dams. A further problem with hydroelectric power is the amount of energy consumption linked to pumping against high water pressure in cases where energy recycling is needed, such as in a pumped storage hydroelectric system.

Therefore, a need exists to overcome the problems with the prior art as discussed above, and particularly for a more efficient way of providing cleaner and more environmentally friendly and recycling alternatives for power generation, namely, hydroelectric power generation.

SUMMARY OF THE INVENTION

A hydrodynamic energy generation system is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the hydrodynamic energy generation system comprises in the bottom of the system a special design of a neutralized pressure pump, tailed or equipped with two inlets, one of them of low head pressure and the other of high head pressure. The pump is surrounded by special fluid circulation housing structure of three vertically aligned compartments and a fourth compartment proximate to the lower ends of the vertically aligned compartments. The pump has a low fluid pressure valve interfaces with first compartment, and a high fluid pressure valve interfaces with the second compartment. Each of the three vertically aligned compartments has an opening on an upper end and a lower end. The first compartment has a first turbine mechanically coupled to a first generator producing electrical power when the first turbine is moved by water that falls into the first compartment. A controlled water level under the first turbine and within the first compartment. A second turbine proximate to the opening at the second compartment's lower end is mechanically coupled to pump and a second generator through external gear box or reverse speed reducer, producing mechanical rotational power when the second turbine is moved by water flowing out of the second compartment's lower end opening.

A pump for moving water from the first and second compartments through the fourth compartment and into the third compartment is at least partially powered by the second generator and an external power source. To clarify the links between second water wheel and pump, if the system stopped during operation, then water will try to flood the first compartment which has low level of water by water coming from second and third compartment through forth compartment, and through second water wheel and backward through pump, the gear box in this case will stand between opposing rotation of pump and water wheel and stops such rotation if they were of similar disk size and similar head pressure force, and in case the water wheel disk is to be bigger than the driving pump disk, then by means of levering force, the water wheel force will win and drive the pump in its pumping mode. In the operation mode we will control such size of each component and the amount of outside energies utilized in driving the components.

The foregoing and other features and advantages will be apparent from the following more particular description of the preferred embodiments, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 6 is a diagram of a pressure neutral pump, in one embodiment.

DETAILED DESCRIPTION

Figure 1:
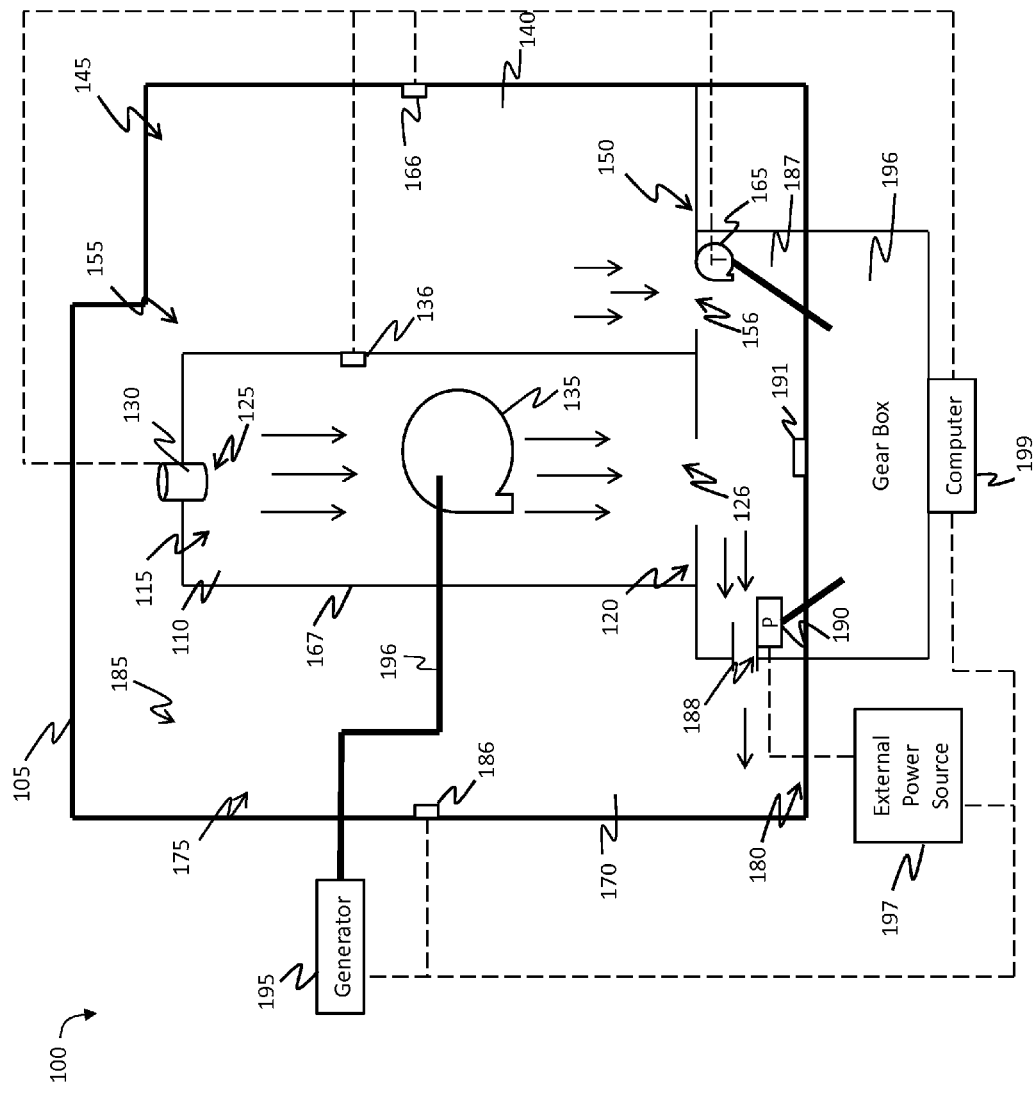
FIG. 1 is a block diagram illustrating the hydrodynamic energy generation system, in accordance with one embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

In accordance with the embodiments described herein, a neutralized pressure pump in the bottom of a hydrodynamic energy generation system is disclosed that overcomes the problems with the prior art as discussed above, by providing an energy generation system that utilizes clean, renewable energy and does not produce waste. As an improvement over conventional energy generation systems, the disclosed systems allows for the production of energy using falling water that is plentiful and renewable or a recycled method, without the drawbacks of burning fossil fuels—i.e., waste products. Also, the hydrodynamic energy generation system provides a system with a minimal number of component parts, thereby reducing the potential for failure or malfunction of its combination parts. Further, the minimal number of component parts allows for quick and inexpensive fabrication of the combination parts, thereby resulting in an economical system. Lastly, the hydrodynamic energy generation system is easily maneuverable, easily transportable, inexpensive to manufacture and lightweight in its physical characteristics.

In this embodiment, high pressure forces working against pumping efforts will be utilized in a favorable direction, by circulating fluid through a second pump inlet, to drive a water wheel, which is in turn coupled through gears to driving the pump. For such utilization to be possible, we needed to have two inlets before the pump one of them of low pressure, a gear box and or energy generator that allows the coupling of the water wheel and the pump FIGS. 2 & 6. It is not the first time in history to use opposing force energy in favorable direction and the good example is the work of Herman Fottinger around 1904 who was able to benefit from the hydrodynamic energy of the water jet created behind a ship, by changing its force direction through a hydrodynamic transmission, and to apply its force to rotate the engine of the ship. In his case the water jet was already there and needed a method to apply its force, in opposite direction, to help driving the ship engine. In our case we needed to create the path of such hydrodynamic movement behind the pump, to peripherally contact and drive a water wheel, which is mechanically coupled to drive the pump.

The embodiments of the hydrodynamic energy generation system will be described heretofore with reference to FIGS. 1 through 6 below. FIG. 1 is a block diagram illustrating the hydrodynamic energy generation system 100, in accordance with one embodiment. In one non-limiting embodiment, the system 100 may include a housing 105 or other vertically aligned element, comprising a hollow interior. The housing may comprise a tubular shaped body, and may, alternatively, integrate a horizontal part or different portions in a variety of sequences or configurations. In other embodiments, the housing can comprise a cube or other hollow shaped bodies. The housing can comprise material having properties capable of containing water such as aluminum, alloys, iron, glass, ceramic, plastic any combination thereof. The hydrodynamic energy generation system 100 may be fully or partially submerged in a body of water (such as an ocean, lake or river).

The housing has vertically aligned three compartments. In the present embodiment, the first vertically aligned compartment 110 (called a gravity preferred compartment) is located between the second vertically aligned compartment 140 (Called a pressure preferred compartment) and the third vertically aligned compartment 170 (called a buoyancy preferred compartment of fluid movement, where buoyancy promotion factors may be applicable to help fluid move in the upward direction). However, this is not be a limitation and the first compartment can be positioned in other configurations. A fourth compartment 187 is located within the housing and proximate to the lower ends of the first, second, and third vertically aligned compartments and comprises in part, the feeding path of the pump. The fourth compartment may positioned be below the first compartment spanning the entire lower end of the first compartment. The fourth compartment may also positioned such that a portion of the second and third compartments are positioned on top of the fourth compartment and a portion of the second and third compartments are positioned on the sides of the fourth compartment. However, other embodiments are within the spirit and scope of the invention.

In the present embodiment the compartments are defined by vertical and horizontal walls or structures 167 within the housing. The first vertically aligned compartment has an upper end 115 and an opposing lower end 120. A first opening 125 is located at the top end of the first compartment and configured to allow water to flow into the first compartment. A second opening 126 is located at the lower end of the first compartment and is configured to allow water to flow out of or exit the first compartment and flow into the fourth compartment 187. The present embodiment may also include may further include a valve 130 coupled to the upper end of the first compartment for controlling and regulating an amount of water that enters the opening at the upper end of the first compartment through the first opening and the water level at the bottom of the first compartment in coordination with special water level sensor and also in coordination with pump flow rate. The valve 130 may comprise one or more valves for regulating flow of water, such as a ball valve, a butterfly valve, a gate valve, a globe valve, a needle valve, a spool valve or a safety valve. The valve 130 may further be a check valve or foot valve, which are unidirectional valves that only allow water to flow in one direction.

The present embodiment may also include a first water wheel and/or turbine 135 (chained or otherwise mechanically coupled with a first generator 195), wherein the first water wheel and/or turbine is located below the valve 125. The first generator produces electrical power when the first water wheel and/or turbine is moved by the water entering the opening 125 and falling into the interior of the first compartment. The first water wheel and/or turbine may comprise a rotating machine that converts hydrodynamic power into mechanical power that drives the first generator (and/or another set of water pumps), which produces electrical power. The amount of power generated by the first generator is proportional to the amount of water falling into the first compartment and is further proportional to the distance from the opening 125 to the first turbine.

The second vertically aligned compartment within the housing has a first opening 155 on an upper end 145 and a second opening 156 on a lower end 150 of the compartment. The second opening of the lower end of the second compartment is configured for fluid to flow or drain from the second compartment into the fourth compartment, passively or through internal water jet. A second water wheel and/or turbine 165 is proximate to the second opening of the second compartment. The water flow through opening 156 is configured to move in a peripheral contact around the water wheel 165 and may be jet directed using an internal jet powered by external power source, The second waterwheel or turbine is mechanically coupled to pump through a second generator or gearbox (or reverse speed reducer) 196 that produces electrical or rotational power when the second waterwheel is moved by water exiting the lower end of the second compartment. The second water wheel and/or turbine may comprise a rotating machine that converts hydrodynamic power into mechanical power that drives a gear box 196 (further illustrated in FIG. 2 and explained below), which produces and manipulate a rotational power between the Second Water wheel disk (165) and the external jet pump (190) disk. The amount of rotational power generated by the second turbine is proportional to the amount of water passing through and the elevation of the second compartment.

The third vertically aligned compartment 170 within the housing has a first opening 185 on the upper end 175 of the third compartment and a second opening 188 at the lower end 180 of the third compartment. The upper end of the third compartment is in fluid communication with the first and second compartments such that water can flow from the first opening 185 of the third compartment into the first and second compartments via the first and second compartments' first openings 125, 155. The second opening of the lower end of the third compartment is configured for fluid to flow or be pumped from the fourth compartment into the third compartment.

The fourth compartment 187 within the housing is positioned proximate to the lower ends of the first, second and third compartments. The fourth compartment is configured such that the second openings at the lower ends of the first, second and third compartments provide fluid communication with the fourth compartment. Additionally, valves may be used at the openings of all the compartments to control the flow of fluid or water between the compartments. Such valves may comprise one or more valves for regulating flow of water, such as a ball valve, a butterfly valve, a gate valve, a globe valve, a needle valve, a spool valve or a safety valve. The valve may further be a check valve or foot valve, which are unidirectional valves that only allow water to flow in one direction.

A pump 190 or external jet for moving water from the fourth compartment 187 into the third compartments 170 is positioned proximate to the second opening of the third compartment. The pump is mechanically coupled to the second generator or gear box 196 and is adapted so that it can be at least partially powered by the second generator. In other embodiments additional pumps may be used. The pump, or any other item of the present embodiment that requires electricity can be coupled (via a conductive coupling) and powered via an external power source. Such external power source maybe the utility power grid or another power producer, such as solar power, wind power, hydroelectric power, nuclear power, battery power etc.

The structure comprised of pump 190, the forth compartment, the second turbine (165), the low fluid head pressure opening or inlet (126) and the high fluid head pressure opening (156) and the external gear box (reverse speed reducer) all together comprises a "neutralized pressure pump" where head pressure applied to driving second turbine is equal (or more as fluids start to acquire speed) than head pressure faces the external jet at any given elevation.

In the event the system 100 is a net consumer of energy, the system 100 has the utility identical in certain dynamics to a pumped storage hydroelectricity system. However the disclosed system is different in that, due to the installation under the surface of a body of water, or due to equal elevation of water in second and third compartments, pumping water does not require more energy, when the elevation between the level of storage (or water return level) and the level of pumping is increased due to using equal value of challenging head pressure that faces the pump to participate through the second compartment, second turbine and connecting gear box, in driving the pump rotational energy. As is well known in the art, pumped-storage hydroelectricity is a net consumer of energy and yet has a known utility. Pumped-storage hydroelectricity (PSH) is a type of hydroelectric energy storage used by electric power systems for load balancing. The method stores energy in the form of gravitational potential energy of water, pumped from a lower elevation reservoir. Low-cost off-peak electric power is used to run the pumps. During periods of high electrical demand, turbines produce electric power. Although the losses of the pumping process makes the plant a net consumer of energy overall, the system increases revenue by selling more electricity during periods of peak demand, when electricity prices are highest. This same utility may apply to system 100.

In above ground installations of PSH systems, pumping water to higher levels of storage consumes higher energy, and remains at all times energy net negative. In the disclosed system, however, while higher energy in deeper systems may be obtained from water falling through an opening, pumping a fixed amount of water out of the system consumes a similar amount of energy at different levels of depth, due to neutralizing the pressure factor in the known pumping formula, by using the gear box between the external jet pump (190) and second turbine (165). The formula in general is, (pumping energy=change of pressure*flow), and in our system, change of pressure is maintained around or less than 1, regardless of pumping elevation. And the formula is (pumping energy=1*turbine disk to pump disk diameter ratio*Flow+ external energy source) where 1 in the formula is the ratio of head pressure in third compartment to the head pressure in second compartment, which means both flow and pumping energy remain the same regardless of elevation, thereby giving rise to the potential that at a certain depth, the energy produced may exceed energy consumed. In the disclosed system, if the falling water produces more energy as we the system is deployed in a deeper depth and when discharging this falling water consumes the same amount of energy regardless of depth, then the disclosed system may at a certain depth reach the level of being a net producer of energy. Such gain is not produced from breaking physics laws, but rather from a bar falling domino style of displacing fluids to the edge of falling under gravity force, and capturing such force by means of moving and rotating the first turbine. Secondly, when the diameter ratio of the second turbine disk (165) and the driving disk of external jet or pump (190) is bigger than 1, then based on such ratio we may, establish secondary gain in torque force that may be translated in partial increase in speed or torque or both to the pump driving disk or external jet, through a speed reducer function of the gear box.

The hydrodynamic energy generation 100 may further be mechanically stationed and fixed steady in place, such as attaching the system to one or more concrete pads, metal constructions or any other fixed support. In one embodiment, the housing includes a filter coupled to the valves at the top of the housing, wherein the filter eliminates unwanted debris from the water flowing through the valves. It is desirable to eliminate the intake of debris and other unwanted material so as to reduce or eliminate clogs and other malfunctions.

The present embodiment may further include a first sensor 136 for detecting water flow and level as water falls into the first compartment 110 via the opening 125. The first sensor may be an accelerometer, a water flow sensor, a temperature sensor, a conductance measurement device, a barometer, a pressure sensor, etc. The present embodiment may also include a second sensor 166 for detecting an amount of water flowing into the second compartment 140. The second sensor may be an accelerometer, a water flow sensor, a temperature sensor, a conductance measurement device, a barometer, a pressure sensor, etc. The present embodiment may also include a third sensor 186 for detecting an amount of water flowing into the third compartment 140 and for detecting the level of the water in the third compartment. The third sensor may be an accelerometer, a water flow sensor, a temperature sensor, a conductance measurement device, a barometer, a pressure sensor, etc. The present embodiment may also include a fourth sensor 191 for detecting an amount of water flowing into the fourth compartment 140. The second sensor may be an accelerometer, a water flow sensor, a temperature sensor, a conductance measurement device, a barometer, a pressure sensor, etc. In FIG. 1, the first, second, third and fourth sensors may be one integrated unit or may comprise a plurality of sensors distributed throughout the system 100 in different locations.

The present embodiment may further include a computer or control processor 199. The processor may be communicatively coupled with valve 130, first generator 195, first water wheel or turbine 135, second water wheel or turbine 165, pump 190, and sensors 136, 166, 186, 191 as well as power source 197 and second generator or gear box 196. In one embodiment, processor 199 may be a central processing unit, microprocessor, integrated circuit, programmable device or computing device, as defined below with reference to FIG. 4. The control processor 199 is configured for reading data from the first, second, third and fourth sensors, first generator, second generator or gear box, and first and second water wheels or turbines and sending control signals to the valve and pump and second turbine, wherein the control signals are configured to activate the valve to regulate an amount of water that enters the first opening of the upper end of the first compartment, to activate the pump to move water from the fourth compartment and into the third compartment and to regulate an amount of water maintained in the first, second and third compartments.

As water moves from the fourth compartment 187 and into the third compartment 170, the water level rises in the third compartment until water flows into the first and second compartments. As water flows into the first compartment, gravity forces water to move the first water wheel, situated above controlled water level. As water flows into the second compartment, The difference of water level between second compartment and first compartment while interconnected, forces water to move to the lower end of the second compartment and into the fourth compartment thereby moving the second water wheel, by means of head pressure force, as water exits the second compartment. In the present embodiment, the second water wheel/turbine is positioned within the fourth compartment proximate to the second opening of the second compartment. However, in other embodiments, the water wheel may be positioned proximate to the second opening and within the second compartment.

Figure 2:
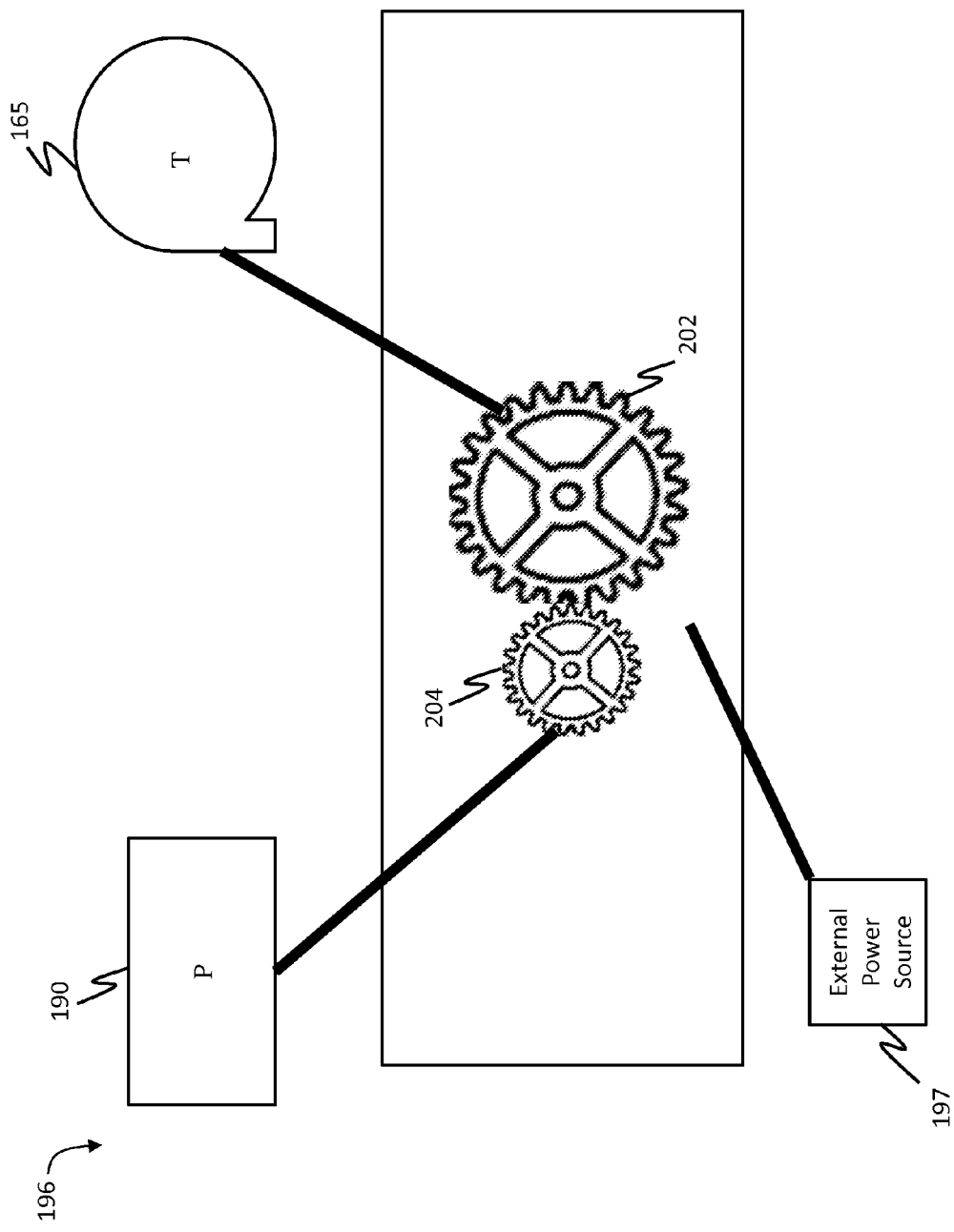
FIG. 2 is a block diagram illustrating the second generator or gear box of the hydrodynamic energy generation system, in accordance with an alternative embodiment.

FIG. 2 is a block diagram illustrating the second generator or gear box 196 for the energy generation system 100, in accordance with one embodiment. The second generator can be located outside the housing 105 of the hydrodynamic assisted pump. The second generator may include a second housing 205 that houses gears and the gear box may be interconnected with a second generator. The second water wheel or turbine may be mechanically coupled (such as via an axle) to a first set of gears including a large gear (or disk) 202 and a small gear (or disk) 204, wherein the small gear (or disk) 204 moves at a higher rotational speed to drive pump 190. Pump 190 pumps or moves water out of the fourth compartment through opening 188 and directly to the third compartment 170. In one embodiment, various sets of gears may be chained in sequence to propagate power to other systems, pumps or sets of gears.

Figure 3:
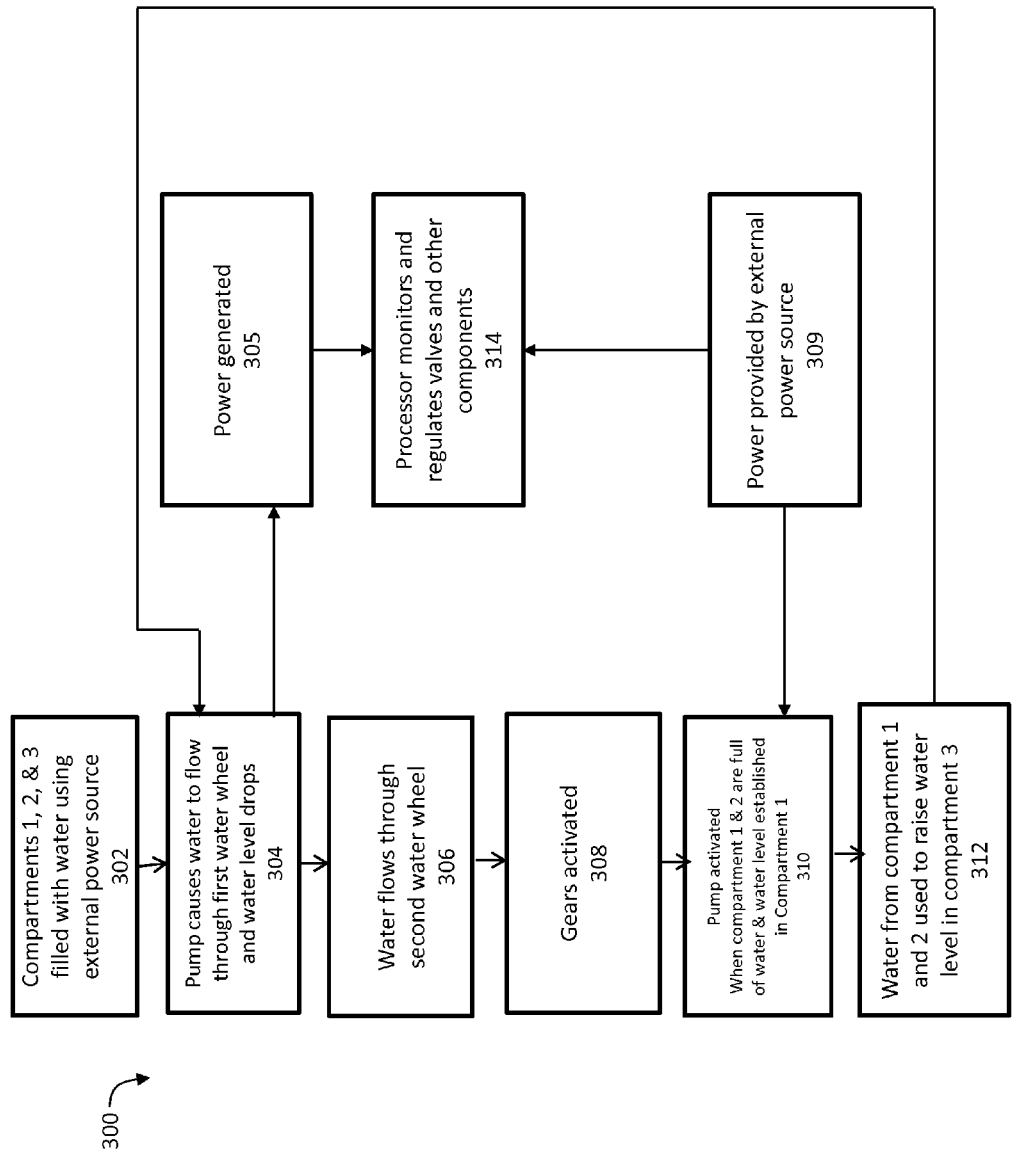
FIG. 3 is a flow chart depicting the method of the hydrodynamic energy generation system, in accordance with one embodiment.

FIG. 3 is a flow diagram illustrating the process flow 300 of the operation of the system 100, in accordance with one non-limiting embodiment. First, in step 302, the first second, third and fourth compartments are filled with water to a certain level using an external power source. The external power source can be external power source 197. As mentioned above, the external power source can be generated from the electrical utility grid, solar power, wind power, nuclear power etc.

Next, in step 304, pump 190 is activated to cause water within the fourth compartment 187 to flow into the third compartment via opening 188. As the pump moves water into the third compartment the water level rises of the third compartment rises until water flows into the first and second compartments. As water begins to fall free into the first compartment, water flows through the first water wheel. As water passes through the first turbine/water wheel and into the lower end of the second compartment, the process moves to step 305 and electrical power is generated via the turbine.

As water continues to flow from the third compartment into the second compartment 140, the process moves to step 306. In step 306, as water enters into the second compartment, water flows through the second water wheel as it exits the second compartment into the fourth compartment via opening 156.

Next in step 308, as water begins to flow into the fourth compartment the second water wheel or turbine 165, turns and, the gears of gearbox or generator are rotated generating electrical power.

After the gears are activated, the process moves to step 310, and the gears or generator can generate power to at least partially power the pump. In step 309, the pump can be provided power by the external power source 197 in order to partially power the pump.

After the pump is activated, the process moves to step 312. In step 312, water from compartment one and two entering into compartment four can be used to continuously raise the water level of compartment three. As the water level of compartment three raises, the process moves back to step 304 and is continued until a user desires to terminate the process. Additionally, in step 314, the power generated by the first generator or the power provided by the external power source and by use to power any component of the system, as well as to provide power to monitor and regulate the valves and to control the components of the system.

Figure 5:
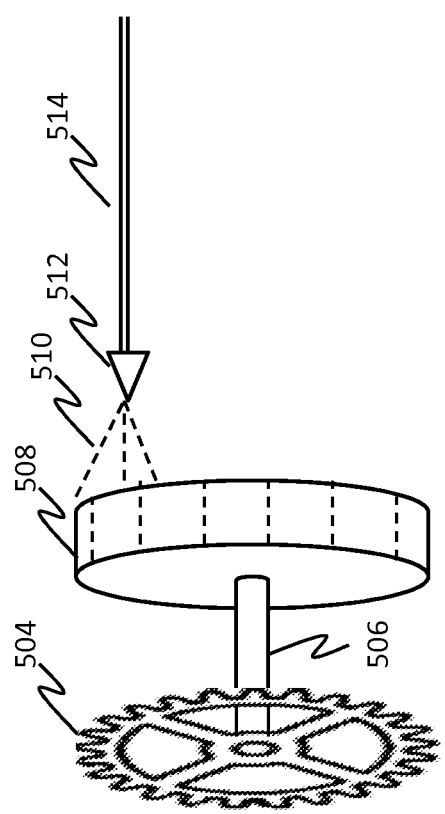
FIG. 5 is a block diagram illustrating a gear system and water wheel of the hydrodynamic energy generation system, in accordance with yet another alternative embodiment.

FIG. 5 is a block diagram illustrating a gear 504 and water wheel 508 of the hydrodynamic energy generation system 100, in accordance with yet another alternative embodiment. FIG. 5 provides more detail on how gears 202, 204 of FIG. 2 may be powered. FIG. 5 shows that the gear 504 may be connected to a water wheel 508 concentric with the gear 504, via a shaft 506 extending along the centerline of the gear 504 and water wheel 508. The water jet 512 expels a water stream 510 (or another liquid) at high speed towards the water wheel 508, which rotates or turns, thereby moving the shaft 506, and moving the gear 504. Water supply line 514 provides water to the jet 512.

Water jet 512, which may comprise a nozzle, may rotate or change its position or orientation so as to change how the water 510 (or other liquid it expels) hits or interacts with the water wheel 508. In one example, the water jet 512 may rotate or change its position or orientation such that the water stream 510 hits or interacts with the water wheel 508 near the outer circumference of the water wheel 508, so as to maximize the torque experienced by the water wheel 508 as a result of the impact of the water stream 510. In another example, the water jet 512 may rotate or change its position or orientation such that the water stream 510 hits or interacts with the water wheel 508 near the center of the water wheel 508, so as to minimize the torque experienced by the water wheel 508 as a result of the impact of the water stream 510. As explained above, the control processor 199 is configured for sending control signals to the water jets, wherein the control signals are configured to move the jets (i.e., their positions orientations or rotations), activate any valves in the jets to regulate an amount of water that exits the jets, and activate any valves in the jets to regulate pressure of water that exits the jets. This allows the control processor 199 to control or manage how much energy is produced by the generator 502.

Figure 4:
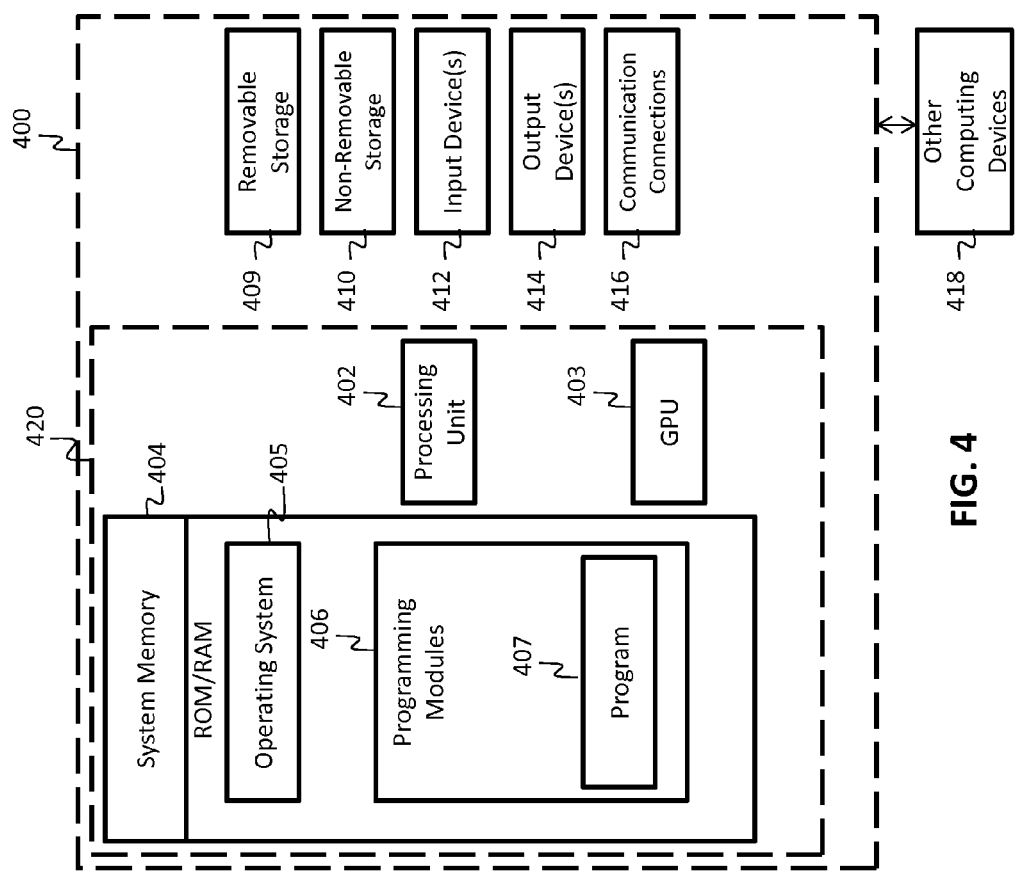
FIG. 4 is a block diagram of a system including an example computing device and other computing devices.

FIG. 4 is a block diagram of a system including an example computing device 400 and other computing devices. Consistent with the embodiments described herein, the aforementioned actions performed by computer 199 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the method shown in FIG. 3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods shown in FIG. 3 above. Computing device 402 may also include a graphics processing unit 403, which supplements the processing capabilities of processor 402 and which may execute programming modules 406, including all or a portion of those processes and methods shown in FIG. 3 above. The aforementioned processes are examples, and processing units 402, 403 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A hydrodynamic energy generation system, comprising:
a housing comprising a hollow interior;
   a pump located at a bottom of the system, the pump equipped with a first fluid inlet providing fluid at a low head pressure and a second fluid inlet at a high head pressure;
   a first vertically aligned compartment within the housing, wherein the first vertically aligned compartment has a first opening on an upper end and a second opening on a lower end, which interfaces with the first fluid inlet;
   a first water wheel located below the opening on the upper end and within the first compartment, wherein the first water wheel is mechanically coupled to a first generator that produces electrical power when the first water wheel is moved by water that falls into the first compartment;
   a controlled water level under the first water wheel; a second vertically aligned compartment within the housing, wherein the second compartment has a first opening on an upper end and a second opening on a lower end, which interfaces with the second fluid inlet;
   a second water wheel proximate to the second opening of the second compartment, wherein the second water wheel is mechanically coupled to the pump and to a second generator or an external gear box and produces electrical or mechanical rotational power when the second water wheel is moved by means of peripheral surface contact of water exiting the lower end of the second compartment;
   a third vertically aligned compartment within the housing, wherein the third compartment has a first opening on an upper end and a second opening on the lower end, wherein the upper end of the third compartment is in fluid communication with the first and second compartments;
   a fourth compartment within the housing arranged proximate to the lower ends of the first, second and third compartments, wherein the second openings of the first, second, and third compartments provide fluid communication with the fourth compartment;

wherein, the pump removes water from the fourth compartment into the third compartment, and the pump is mechanically coupled to the second water wheel through the external gear box and at least partially powered by the second generator, and wherein the pump is at least partially powered by an external power source; and a coupling for conductively coupling the hydrodynamic energy generation system with the external power source.

2. The hydrodynamic energy generation system of claim 1, further comprising a first sensor for detecting water flow and water level at the bottom of the first compartment.

3. The hydrodynamic energy generation system of claim 1, further comprising a second sensor for detecting water flow through the second compartment.

4. The hydrodynamic energy generation system of claim 1, further comprising a third sensor for detecting the amount of water in the third compartment.

5. The hydrodynamic energy generation system of claim 1, further comprising a fourth sensor for detecting water flow through the fourth compartment.

6. The hydrodynamic energy generation system of claim 1, further comprising a valve coupled to the upper end of the first compartment for controlling the amount of water that enters into the first compartment through its first opening.

7. The hydrodynamic energy generation system of claim 1, further comprising a control processor communicatively coupled with the valve, the pump, the second water wheel, the first, second, third and fourth sensors, and second generator.

8. The hydrodynamic energy generation system of claim 7, wherein the control processor is configured for;

reading data from the first, second, third and fourth sensors, the pump and second water wheel; and sending control signals to the valve, pump, and second water wheel wherein the control signals are configured to adjust the valve to regulate an amount of water that enters the first opening of the first compartment, and to activate the pump and turbine to regulate an amount of water maintained in the first, second and third compartments.

9. The hydrodynamic energy generation system of claim 1, wherein the processor is communicatively coupled to the first water wheel and configured for reading data send from the first water wheel.

10. The hydrodynamic energy generation system of claim 1, wherein the water wheel is a turbine.

11. A hydrodynamic energy generation system, comprising:

a housing comprising a hollow interior;

a first vertically aligned compartment within the housing, wherein the first vertically aligned compartment has an first opening on an upper end and a second opening on a lower end;

a first turbine located below the opening on the upper end and within the first compartment, wherein the first turbine is mechanically coupled to a first generator that produces electrical power when the first turbine is moved by water that falls into the first compartment;

a first sensor for detecting water flow through the first compartment;

a second vertically aligned compartment within the housing, wherein the second compartment has a first opening on an upper end and a second opening on a lower end;

a second turbine proximate to the second opening of the second compartment, wherein the second turbine is mechanically coupled to a second generator or gear box that produces electrical or mechanical rotational power when the second turbine is moved by water exiting the lower end of the second compartment;

a second sensor for detecting water flow through the second compartment;

a third vertically aligned compartment within the housing, wherein the third compartment has a first opening on an upper end and a second opening on the lower end, wherein the upper end of the third compartment is in fluid communication with the first and second compartments;

a third sensor for detecting water flow in the third compartment;

a fourth compartment within the housing arranged proximate to the lower ends of the first, second and third compartments, wherein the second openings of the first, second, and third compartments provide fluid communication with the fourth compartment;

a fourth sensor for detecting water flow through the fourth compartment;

a pump for removing water from the fourth compartment into the third compartment, wherein the pump is mechanically coupled to a second turbine through the gear box and at least partially powered by the second generator, and wherein the pump is at least partially powered by an external power source;

a coupling for conductively coupling the hydrodynamic energy generation system with the external power source; and, a valve coupled to the upper end of the first compartment for controlling the amount of water that enters into the first compartment through its first opening.

12. The hydrodynamic energy generation system of claim 11, further comprising a control processor communicatively coupled with the valve, the pump, the second turbine, the first, second, third and fourth sensors, and second generator.

13. The hydrodynamic energy generation system of claim 12, wherein the control processor is configured for;

reading data from the first, second, third and fourth sensors, the pump and second turbine; and sending control signals to the valve, pump, and second turbine wherein the control signals are configured to adjust the valve to regulate an amount of water that enters the first opening of the first compartment, and to activate the pump and second turbine to regulate an amount of water maintained in the first, second and third compartments.

14. The hydrodynamic energy generation system of claim 13, wherein the processor is communicatively coupled to the first turbine and configured for reading data send from the first turbine.

15. A hydrodynamic energy generation system, comprising:

a housing comprising a hollow interior;

a first vertically aligned compartment within the housing, wherein the first vertically aligned compartment has an first opening on an upper end and a second opening on a lower end;

a first water wheel located below the opening on the upper end and within the first compartment, wherein the first water wheel is mechanically coupled to a first generator that produces electrical power when the first water wheel is moved by water that falls into the first compartment;

a second vertically aligned compartment within the housing, wherein the second compartment has a first opening on an upper end and a second opening on a lower end;

a second water wheel proximate to the second opening of the second compartment, wherein the second water wheel is mechanically coupled to a second generator or gear box that produces electrical or mechanical rotational power when the second water wheel is moved by water exiting the lower end of the second compartment;

a third vertically aligned compartment within the housing, wherein the third compartment has a first opening on an upper end and a second opening on the lower end, wherein the upper end of the third compartment is in fluid communication with the first and second compartments;

a fourth compartment within the housing arranged proximate to the lower ends of the first, second and third compartments, wherein the second openings of the first, second, and third compartments provide fluid communication with the fourth compartment;

at least one pump for removing water from the fourth compartment into the third compartment, wherein the at least one pump is mechanically coupled to and at least partially powered by the second generator, and wherein the at least one pump is at least partially powered by an external power source; and a coupling for conductively coupling the hydrodynamic energy generation system with the external power source.

16. The hydrodynamic energy generation system of claim 15, further comprising a valve coupled to the upper end of the first compartment for controlling the amount of water that enters into the first compartment through its first opening.

17. The hydrodynamic energy generation system of claim 16, further comprising a control processor communicatively coupled with the valve, the at least one pump, the second water wheel, the first, second, third and fourth sensors, and second generator.

18. The hydrodynamic energy generation system of claim 17, wherein the control processor is configured for;
    reading data from the first, second, third and fourth sensors, the at least one pump and second water wheel; and
    sending control signals to the valve, at least one pump, and second water wheel, wherein the control signals are configured to adjust the valve to regulate an amount of water that enters the first opening of the first compartment, and to activate the at least one pump and second turbine to regulate an amount of water maintained in the first, second and third compartments.

19. The hydrodynamic energy generation system of claim 15, wherein the processor is communicatively coupled to the first turbine and configured for reading data send from the first turbine.

* * * * *